United States Patent [19]
Burr

[11] Patent Number: 5,439,503
[45] Date of Patent: Aug. 8, 1995

[54] PROCESS FOR TREATMENT OF VOLCANIC IGNEOUS ROCKS TO RECOVER GOLD, SILVER AND PLATINUM

[76] Inventor: Lynn E. Burr, 2238 Lucerne Dr., Henderson, Nev. 89014

[21] Appl. No.: 188,727

[22] Filed: Jan. 31, 1994

[51] Int. Cl.$^6$ ............................................. C23B 3/06
[52] U.S. Cl. ........................................ 75/421; 75/422; 75/423
[58] Field of Search ............... 75/421, 422, 423, 631, 75/632, 633, 634, 637; 204/109

[56] References Cited

U.S. PATENT DOCUMENTS

| | | | |
|---|---|---|---|
| 4,695,317 | 9/1987 | Kimura et al. | 75/631 |
| 4,892,631 | 1/1990 | White | 204/109 |
| 5,238,484 | 8/1993 | Shubert | 75/421 |

Primary Examiner—Melvyn Andrews
Attorney, Agent, or Firm—K. S. Cornaby

[57] ABSTRACT

The recovery of gold, silver and platinum group metals from volcanic cinders containing iron is achieved by mixing the cinders with a suitable flux, and metallic copper, and smelting the mixture at a sufficiently high temperature to produce a molten mass of metal containing iron and copper, and a molten slag. The molten slag is separated from the molten metal mass by a suitable means. The slag is discarded and the metal mixture is cooled to a solid state. The copper and iron are then dissolved in acid, leaving an undissolved portion which can then be separated from the resulting leach liquor by filtration. Alternatively, the iron and copper bearing metal can be cast into an anode and electrolyzed in a sulfuric acid solution where copper is deposited at the cathode and iron is put into solution as iron sulfate. The insoluble residue at the anode can be recovered from the sulfuric acid solution by filtration. The filtered solids from either acid dissolution or electrolysis contain a significant amount of the gold, silver, and platinum group metals that were present in the original ore. These solids can then be processed by well known technology to recover their gold, silver, and platinum group metal content in essentially pure form. The solution which contains most of the silver can be treated by conventional means to recover that metal. With electrolysis copper is recovered as a cathode deposit. With acid dissolution copper can be recovered by other conventional methods. With either method copper can be recycled to the process.

2 Claims, No Drawings

PROCESS FOR TREATMENT OF VOLCANIC IGNEOUS ROCKS TO RECOVER GOLD, SILVER AND PLATINUM

BACKGROUND OF THE INVENTION

This invention relates to the treatment of volcanic igneous rocks, commonly called volcanic cinders, to recover the gold, silver and platinum group metals therefrom.

A common volcanic ore is composed of silicates and oxides with major amounts of iron, magnesium and aluminum, with lesser, but significant, amounts of sodium, boron, calcium, fluorine, and phosphorus (from tenths of a percent to three percent of these elements). The ore contains a major amount of magnetite. At a grind of 43 percent minus 65 mesh plus 200 mesh and 57 percent minus 200 mesh, 54.6 percent of the sample was strongly magnetic. Not all of this magnetic material is magnetite, however, since much of the magnetite is locked with non-magnetics. The phosphors and fluorine are assumed to come from apatite, $Ca_5F(PO_4)_3$, a mineral commonly associated with magnetite in igneous rocks.

Volcanic cinders, as typified by the ore described above, are extremely resistant to all of the procedures normally used in the treatment of precious metal ores. A typical smelting process is one in which all of the materials charged to a smelting furnace are completely fused or melted, resulting in two or more liquid products which stratify into separate layers upon sending, with the slag, the liquid of lowest specific gravity, forming the top layer which is skimmed off. In most smelting operations the slag is a waste product which serves as a vehicle to eliminate substances which are not desired in the valuable products recovered from the lower layers of molten material. The bosom layer can be a metal, such as lead in lead smelting, iron in iron smelting, or copper in some types of copper smelting. An intermediate layer can be a matte (principally molten sulfides), or a speiss (molten arsenides and/or antimonides). It is well known that molten lead serves as a solvent, or collector, for gold, silver, and the platinum group metals in the smelting of lead ores. Similarly, liquid copper and liquid mattes (molten sulfides of copper and iron, or nickel and iron) serve as collectors for the precious metals (gold, silver, and the platinum group) in copper and nickel smelters.

SUMMARY

In the investigations leading to the invention, lead was first considered as a possible molten solvent or collector of the precious metals in the smelting of volcanic cinders. Standard fire assaying is a miniature, laboratory sized, lead smelting process in which the materials charged to the laboratory crucible are smelted to result in two liquid layers, a lead layer which settles to the bottom of the crucible and a lower specific gravity slag layer on top of the lead layer which carries off the undesirable wastes in the ore. The lead contains the precious metals which are then recovered from the lead to complete the assay.

A second procedure used in the investigation employed an iron alloy as the collection. In this procedure, four furnace charges consisted of twenty-five (25) pounds of ore and twenty-one and one-half (21.5) pounds of borax for flux were used. The ore contains several percent carbonaceous material which occurs naturally, and this provides most of the reducing agent. The material serves not only as a reducing agent, but also as an alloying element which allows the melting point of iron to be reduced. Just as in pig iron production, the second most abundant element in the alloy after iron is a few percent of silicon. The iron also contains two (2) to three (3) percent phosphorus, which together with the silicon and carbon reduces the melting point of the resulting alloy to the temperature range of the investigations (1000°–1260° C.). The amount of iron alloy produced was 1.75 pounds from 100 pounds of ore.

The iron alloy was then dissolved electrolytically in a twenty percent (20%) sulfuric acid solution. The iron alloy served as the anode and a stainless steel sheet was used as the cathode. A standard fire assay of the residue which remained after dissolving the iron showed that gold was a major constituent of the residue and that the iron alloy was a good collector for gold, in the absence of lead. This procedure avoided the toxicity and environmental problems associated with lead.

A flux is a material which converts compounds that are infusible at a certain temperature into others which melt at that temperature. For example, silica ($SiO_2$) is fusible only at a very high temperature, but if sodium carbonate is added the mixture can be fused at a much lower temperature. A mixture of one mole of silica ($SiO_2$) and one mole of sodium oxide ($Na_2O$) will melt at about 1020 C to form a slag of the composition $Na_2SiO_3$, much lower than the melting points of either $Na_2O$ or $SiO_3$. The borax and sodium carbonate used in the experiments covered by this investigation, when mixed with the ore, lowered the melting point of the resulting mixture to allow the use of 1000–1260 degrees centigrade for forming a molten fluid slag. Copper was added to help in the collection of gold since copper and gold show complete mutual solubility in each other.

The mixture of ore, copper, borax and sodium carbonate was heated to 1260 degrees centigrade and held for 30 minutes. In the experiments covered by this disclosure 1.25 pounds of copper, 25 pounds of ore, crushed to minus one-eighth inch, 16.7 pounds of borax, 8.3 pounds of sodium carbonate and one-quarter pound of fluorspar were charged to the furnace crucible. At the end of the furnace melt, the slag was skimmed off and discarded and another identical charge was added to the crucible, after four charges and four slag skimmings the molten metal remaining was poured from crucible into an anode mold where eight pounds of copper and iron metal were formed into an anode bar. After solidification, the bottom layer of the metal bar was grey and had the appearance of cast iron, while the top layer had the typical reddish appearance of copper. However, there was considerable amount of alloying between iron and copper at the interface and the copper had enough iron in it to be magnetic. Each twenty-five (25) pounds of ore melted yielded about two (2) pounds of iron and copper metal. Electrolysis of the eight (8) pound metal bar, approximately $5' \times 5' \times 1''$, in 15–20 weight percent sulfuric acid at 3.5 bolts and 50 amps was complete in approximately sixty (60) hours.

The anode was held in a cloth bag in which the anode residue was collected. For 8 pounds of copper-iron metal the dry weight of the anode residue was about 30 grams. The residue was washed, dried, and further smelted by well known techniques to produce a final Dore' metal, which is essentially an alloy of gold and silver, containing the platinum group metals.

These iron bearing ores were first smelted in a highly reducing atmosphere with the addition of copper to the furnace charge to produce a mixture of copper and iron metal. These metals act as a solvent, or collector, for gold, silver, and the platinum group metals. This action is similar to the smelting of copper ores in which a molten matte (a mixture of iron and copper sulfides) collects gold, silver, and the platinum group metals, and to the smelting of lead ores in which molten lead collects these precious metals. The iron and copper mixture is separated from the slag, then leached in a mineral acid, either with or without electrolysis to dissolve the iron and the copper. The remaining insoluble residue is filtered to separate it from the liquid. The solid residue contains gold, some silver, and the platinum group metals. Most of the silver is dissolved in the acid. The residue contains iron, silicon, and a number of other elements, mostly metals. The residue can be treated by well known sweating methods to produce a precious metal bullion containing gold, silver, and the platinum group metals.

There are two unique features in this invention. A first unique feature is the use of copper and iron in combination as a collector for gold, silver, and the platinum group metals. The practice of iron smelting is well known. Also, the ability of copper to collect the precious metals is well known. Furthermore, the use of electrolytic acid dissolution to dissolve the copper, followed by the recovery of these metals from the anode residue is conventionally used in copper smelting and refining, and is thus well known. However, the combination of iron smelting with the addition of copper, followed by electrolytic acid dissolution of a mixture of copper and iron metal, and recovery of these precious metals from the acid residue is a new way to recover these metals.

The process of the invention will be more specifically illustrated in the following example:

EXAMPLE

The following specific example is illustrative, but not a limitation of the practice of the invention. Four furnace charges, each consisting of 25 pounds of ore crushed to minus one-eighth inch, 16.7 pounds of borax, 8.3 pounds of soda ash (sodium carbonate), one-quarter pound of fluorspar, and 1.25 pounds of copper were thoroughly mixed, heated to 1260 degrees centigrade and held for about one-half hour. The natural carbonaceous content of the ore acted as a reducing agent. The slag and metal were poured into a mold and allowed to cool. The cold slag was broken away from the copper and iron metal. The total weight of metal from the four furnace runs was 7.5 pounds. The metal was then cast into an anode and dissolved electrolytically in a 15–20 weight percent sulfuric acid at 3.5 volts D.C., and 50 amps for 60 hours until the metal node was completely dissolved. The anode was enclosed in a cloth bag, so that at the end of dissolution the insoluble residue was collected in the bag.

The copper from the anode was deposited on two cathodes, while most of the iron went into solution. The residue was washed onto a paper filter, filtered, and washed with water. The dried residue weighed 30 grams which amounted to 0.88 percent of the weight of the anode. The residue was smelted with a standard fire assay flux containing lead oxide, borax, and soda ash. To this was added 15 grams of silver. The lead button, weighing 117 grams, and containing gold, silver, and the platinum group metals was recovered from the melt after pouring and cooling. The lead button was cupelled in the standard fire assaying manner at 800–850 degrees centigrade. In cupellation molten lead oxide is formed which absorbs into the cupel, a cup made of bone ash. The absorption continues until all of the lead oxide is gone leaving only a bead containing gold, silver, and the platinum group metals on the surface of the cupel. The weight of the precious metal bead was 16.66 grams. The bead was parted in 25 weight percent nitric acid which dissolved the silver and some of the platinum group metals, leaving the gold and some of the platinum group metals undissolved. The gold bearing metal was then wrapped in sheet lead and recupelled at 800–850 degrees centigrade to give a final bead weighing 1185 milligrams. The yellow color of the bead suggested that it was principally gold. This calculates to be 0.76 ounce per ton of ore. These figures indicate that an avordupois ton of ore would yield 0.76 ounce of gold and platinum group metals by standard methods of recovery from the anode residues.

I claim:

1. A method for treating iron-bearing igneous ores for the recovery of gold, silver and platinum group metal values contained in such ores by:

mixing an iron-bearing igneous ore containing gold, silver, and platinum group metal values with a suitable flux and copper to form a mixture of ore, flux and copper;

heating the mixture of ore, flux and copper to a sufficiently high temperature to produce a molten mass of metal containing copper, iron, gold, silver and platinum group metal values, and a molten slag;

allowing the molten mass containing copper, iron, gold, silver and platinum group metal values, and slag to settle into a least two layers, so that the molten mass containing copper, iron, gold, silver and platinum group metal values forms a lower molten layer, and the slag forms an upper molten layer;

separating the upper and lower molten layers;

cooling the lower molten layer;

leaching the lower molten layer containing iron, copper, gold, silver and platinum group metal values with a dilute mineral acid to solubilize the iron, copper and most silver values in the presence of increased temperatures of up to about 80 degrees centigrade to form a solubilized iron, copper and silver leachate; leaving an undissolved residue containing gold, some silver and platinum group metal values;

separating the undissolved residue containing gold, some silver and platinum group metal values from the solubilized iron, copper and silver values leachate;

treating the undissolved residue containing gold, some silver and platinum group metal values to recover the gold, silver and platinum group metal values therefrom; and treating the iron, copper and silver values leachate to recover the silver values from the leachate.

2. A method for heating volcanic cinders containing iron, gold, silver and platinum group metal values for the recovery of gold, silver and platinum group metal values therefrom, by:

mixing iron-bearing volcanic cinders containing gold, silver and platinum group metal values with a suitable flux and copper to form a mixture of volcanic cinders, flux and copper;

heating the mixture of volcanic cinders, flux and copper to a sufficiently high temperature to produce a molten mass of metal containing copper, iron, gold, silver and platinum group metal values, and a molten slag;

allowing the molten mass containing copper, iron, gold, silver and platinum group metal values, and slag to settle into a least two layers, so that the molten mass containing copper, iron, gold, silver and platinum group metal values forms a lower molten layer, and the slag forms an upper molten layer;

separating the upper and lower molten layers;

cooling the lower molten layer;

leaching the lower molten layer containing iron, copper, gold, silver and platinum group metal values with a dilute mineral acid to solubilize the iron, copper and most silver values in the presence of increased temperatures of up to about 80 degrees centigrade to form a solubilized iron, copper and silver leachate; leaving an undissolved residue containing gold, some silver and platinum group metal values;

separating the undissolved residue containing gold, some silver and platinum group metal values from the solubilized iron, copper and silver values leachate;

treating the undissolved residue containing gold, some silver and platinum group metal values to recover the gold, silver and platinum group metal values therefrom; and treating the iron, copper and silver values leachate to recover the silver values from the leachate.

* * * * *